United States Patent
Lang et al.

(10) Patent No.: US 11,134,225 B2
(45) Date of Patent: Sep. 28, 2021

(54) VIEW SYSTEM FOR A VEHICLE

(71) Applicant: MEKRA Lang GmbH & Co. KG, Ergersheim (DE)

(72) Inventors: Werner Lang, Ergersheim (DE); Andreas Enz, Burgbernheim (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 0 days.

(21) Appl. No.: 16/856,641

(22) Filed: Apr. 23, 2020

(65) Prior Publication Data
US 2020/0344450 A1     Oct. 29, 2020

(30) Foreign Application Priority Data

Apr. 26, 2019 (DE) ............... 10 2019 110 871.3

(51) Int. Cl.
| | |
|---|---|
| *H04N 7/18* | (2006.01) |
| *H04N 5/225* | (2006.01) |
| *G06T 3/60* | (2006.01) |
| *G06T 3/40* | (2006.01) |
| *G06T 5/00* | (2006.01) |
| *B60R 1/02* | (2006.01) |

(52) U.S. Cl.
CPC ............... *H04N 7/183* (2013.01); *B60R 1/02* (2013.01); *G06T 3/40* (2013.01); *G06T 3/60* (2013.01); *G06T 5/006* (2013.01); *H04N 5/2253* (2013.01); *H04N 5/2254* (2013.01); *B60R 2300/802* (2013.01); *B60R 2300/8046* (2013.01)

(58) Field of Classification Search
None
See application file for complete search history.

(56) References Cited

U.S. PATENT DOCUMENTS

| | | | |
|---|---|---|---|
| 2009/0002523 A1 | 1/2009 | Maekawa | |
| 2010/0110189 A1* | 5/2010 | Kuboyama | ............... B60R 1/12 348/148 |
| 2010/0208071 A1* | 8/2010 | Takahashi | ............... G06T 7/136 348/148 |
| 2013/0010119 A1* | 1/2013 | Mitsugi | .................. H04N 7/183 348/148 |
| 2015/0109446 A1* | 4/2015 | Takano | .................... H04N 7/18 348/148 |

(Continued)

FOREIGN PATENT DOCUMENTS

| | | |
|---|---|---|
| DE | 102014006153 | 10/2015 |
| DE | 102014018040 A1 | 6/2016 |

*Primary Examiner* — Frederick D Bailey
(74) *Attorney, Agent, or Firm* — Cozen O'Connor

(57) ABSTRACT

A view system (100A, 100B) for a vehicle (1) has an image capture unit (10, 10A, 10B) for capturing image data of a portion around a vehicle (1), an image processing unit (20A, 20B) for processing the captured image data, and an image reproduction unit (30, 30A, 30B) for reproducing the processed image data. Included are an image sensor (11) and an optical element having a distortion curve. The image data are distorted dependent on the position of the image sensor according to the distortion curve. The image processing unit (20A, 20B) is adapted for taking at least one partial portion (12, 12') from the image data of the image sensor (11), wherein the geometry of the partial portion (12, 12') is dependent on the position of the partial portion (12, 12') on the image sensor (11).

20 Claims, 7 Drawing Sheets

(56) References Cited

U.S. PATENT DOCUMENTS

| | | |
|---|---|---|
| 2018/0281698 A1 | 10/2018 | Berndt et al. |
| 2019/0075250 A1 | 3/2019 | Asai |
| 2019/0359132 A1* | 11/2019 | Zinner .................... B60R 11/04 |

* cited by examiner (PROJECTION OF GRID CYLINDER)

(PROJECTION OF GRID CYLINDER)

$$\begin{pmatrix} H \sim H' \sim H'' \\ W \sim W' \sim W'' \end{pmatrix}$$

VIEW SYSTEM FOR A VEHICLE

BACKGROUND OF THE INVENTION

1. Field of the Invention

The present invention relates to a view system for a vehicle, in particular a commercial vehicle.

2. Description of the Related Art

With respect to vehicles, it is legally prescribed to make so-called fields of view around the vehicle visible for the driver during driving operation. Which fields of view have to be visible is based on the type of the vehicle, for example, motorcycles, vehicles for transporting passengers, vehicles for transporting goods, etc. The viewability of the fields of view has to be provided by a device for indirect view and the fields of view have to be visible for the driver sitting on the driver's seat by use of the device for indirect view all the time. Dependent on the type of the vehicle and, in particular, on which areas around the vehicle can be directly viewed by the driver, different legal prescriptions require that certain fields of view are permanently and reliable viewable by use of the device for indirect view. In Europe, the fields of view, which have to be reliably visible for a driver at all times, are defined in the UN/ECE-regulation No. 46. Further relevant norms and regulations, respectively, include for instance the ISO 5721, ISO 5006, ISO 16505, ISO 14401 and the EU 167/2013. Besides the legally required fields of view, often further regions around the vehicle, so-called regions of view, are made visible by devices for indirect view. Regions of view may include legally prescribed fields of view.

Commonly, the view of the fields of view is enabled with one or more mirrors. However, mirrors have some disadvantages. For instance, mirrors only show objects to the driver which are located on the same side of the mirror as the driver. Any object behind a mirror cannot be shown by this mirror. In addition, mirrors which are merely made of flat glass show a small region to the driver, except for the mirrors are very close to the driver. In case they are formed convexly, they generate an image distortion. Large vehicles commonly have six or more mirrors which are mounted around the outer side of the vehicle, most of them being convex and distorted which makes it difficult for the driver to pay attention to all relevant mirrors at the same time. Nevertheless, despite all the mirrors, there are still blind spots in the regions of view, i.e., the regions in which no fields of view are located, around these vehicles.

In recent times, it has been increasingly common to consider the use of camera systems as de-vice for indirect view either in addition or as replacement for the mirror as device for indirect view. In such camera systems, an image is continuously captured and detected and processed, respectively, and stored, if so. The (video-)data which are captured by an image capture unit with an image sensor device are transmitted, e.g., by use of a supply unit and, optionally, after processing, to a reproduction device which is located in the driver's cabin. The reproduction device reproduces a view of the respective legally prescribed fields of view or a plurality of fields of view and, optionally, further information such as potential collision risks, distances to other objects, etc. for the area around the vehicle in a manner that the fields of view are permanently visible for the driver at all times. At the same time, the view system promotes an improved night view, more flexible possibilities for arrangement and larger fields of view with the possibility of a lower distortion.

Permanently visible means in this context that the view into the field of view is depicted in a timely uninterrupted manner, that is, not interrupted by alternatingly showing and hiding the field of view or parts thereof or by overlaying other representations such that the field of view cannot be seen completely. Accordingly, the respective field of view or the fields of view are continuously and in real time shown on the display device. This holds at least for fields of view which are prescribed as permanently visible for all vehicle conditions in which the ignition is switched on and/or, preferably, for example, coupled to a sensor which receives a corresponding signal, for example, a door opening signal or an ignition switch signal.

Modern mirrors create a nearly perfectly shaped picture for a driver. The level of detail available for the driver is dependent on the distance to the object, the curvature and the degree of reflection of the mirror and the eyesight of the driver. With camera systems, the level of detail available is affected by many different parameters: The resolution of the camera sensor, the field of view of the camera, but also the resolution of the monitor, how much of the camera field of view is being displayed on the monitor and how big this part is, how far away the monitor is located from the driver's seat and the eyesight of the driver. A substantial parameter which affects the degree of details is the failure of distortion of the optical element of the camera, such as the lens or an arrangement of a plurality of lens. Each optical element has a certain distortion behavior. Usually, the failure of distortion increases at least area by area with increasing distance around a point on the optical element which is also called center of distortion and comprises, for example, the optical axis. Thus, in the center of distortion, the failure of distortion is smallest. The failure of distortion of an optical element may be described and depicted by means of a distortion curve. A distortion curve is the graphical depiction of the failure of distortion of an optical element as function of the distances from a center of distortion, as the optical axis. In case the optical element is rotationally symmetrical, the distortion curve corresponds to the graphical depiction of the failure of distortion as function of the radial distance from the center of distortion. The distortion behavior of an optical element, thus, is a geometric failure of depiction of optical systems, which leads in the lens equation to a local change in the depiction scale.

If an object is located in the proximity, in particular on or adjacent to the center of distortion of the optical element, the depiction is substantially distortion-free and distortion lean, respectively, and it is not necessary to process the image data. The driver views the object on the monitor in a substantially non-distorted and distorted-free manner and may reliable recognize the size of the object and its orientation and portion in the shown vehicle environment and may act correspondingly in order to avoid a collision with the object.

If an object, however, is located in a distance to the center of distortion of the optical element, in particular, in a region in which the distortion behavior is large, the driver views the object on the monitor in a distorted and unclear manner and may not reliably recognize the size of the object and its orientation and position in the shown vehicle environment. In particular, it is difficult for the driver to reliably estimate the amount of distortion without further reference and, thus, to reliably estimate and assess the position and size of objects. Accordingly, collisions be-tween the vehicle and the object may arise due to the distorted and unclear depiction of the object.

This is in particular the case, if the so-called trailer panning is applied, i.e. the tracking of an image section taken from an image sensor. Trailer panning is in particular relevant during cornering or in any other driving situation in which the trailer is rotated relatively to the tractor and the driver and/or a control unit has to track the image section on the monitor, in order to still reliably view the environment around the trailer. Tracking of the image section to the border of the image sensor or generally to a position on the image sensor where the environment around the vehicle is depicted in an extremely distorted manner, however, results in that the corresponding section of the vehicle environment is shown to the driver on the monitor in a non-reality manner and that he cannot reliably estimate the proportions, distances of objects, etc.

From the prior art, besides a mechanical displacement (e.g. pivoting) of the camera, and adaptation of the distortion curve is also known, in order to achieve a depiction which is as distortion-free as possible and to compensate the above-described distortion behavior of the optical element.

Cameras, which can be displaced mechanically, however, have the disadvantage that they can only capture a limited section of the vehicle environment and are liable to wear due to the dis-placement mechanism. In addition, a further sensor device is necessary, in order to detect objects which are not located in the originally captured section.

An adaption of the distortion curve, however, requires an exact and, thus, high computing power adaptation of all points on the original distortion curve. A mechanical/optical compensation is possible by means of complicated lens arrangements and/or arrangements of additional optical elements. Thereby, however, the camera system becomes expensive.

View systems are, for example, known from US 2009/0002523 A1 and DE 10 2014 018 040 A1. US 2018/0281698 A discloses a vehicle camera calibration system.

SUMMARY OF THE INVENTION

Accordingly, it is an object of the present invention to provide a view system for a vehicle, in particular a commercial vehicle, which shows the vehicle environment to the driver as exact as possible independent on its position with respect to the center of distortion, such as the optical axis of an optical element, such that the driver may recognize objects in the vehicle environment as realistically as possible. Simultaneously, the solution should be achieved in a cheap manner.

The above-mentioned object is solved by a view system for a vehicle with the features of claim 1. Preferred embodiments are given in the dependent claims.

An embodiment of the invention is based on the idea to provide a view system for a vehicle with at least one capture unit (e.g. a camera), at least one image processing unit (e.g. an ECU) and at least one image reproduction unit (e.g., a monitor, such as a LCD-, TFT-, or LED-monitor), wherein the image processing unit is configured such that it takes/extracts a partial portion and an image section, respectively, from the image data of a vehicle environment depicted and recorded, on an image sensor of an image capture unit and to show this partial portion of the vehicle environment to the driver on the image reproduction unit. Dependent on the position of the position of the partial portion on an image sensor arranged in the image capture unit, the partial portion has a geometry which is changed in view of another position on the image sensor. The changed geometry is determined by the image processing unit. Due to the changed geometry, a distortion behavior of an optical element included in the image capture unit may be compensated or may at least be reduced, such that the vehicle environment is shown to the driver in a realistic manner or in an at least approximately realistic manner. A changed geometry means, in particular, the change of certain side lengths of the geometry, such as a rectangle, a rotation, a shear and/or a freeform deformation (e.g., polygonal shapes with four corners) of the geometry. In case the geometry would not be changed, but would be always at the same size independent on the position of the taken partial portion on the image sensor, image data of partial portions which are taken from the image sensor at positions where the distortion of the image data is very large, would be shown to the driver in an extremely distorted manner and the driver could not reliably estimate the vehicle environment.

The distortion behavior of the optical element may be, e.g. barrel-shaped or pulvinated/cushion-shaped. In this respect, the size of an object on the image sensor and, accordingly, the monitor decreases with increasing distance to the center of distortion with a barrel-shaped distortion and increases with a pulvinated distortion. The distortion behavior of an optical element, thus, is least next to or in the depiction of the center of distortion, e.g., the optical axis, and increases with increasing distance of the depiction of the center of distortion. The center of distortion is an assumed, thought line through which the center of curvature of the optical element runs. With an optical element of the camera system with a plurality of optical partial elements, i.e., a plurality of lens, which are arranged subsequently to each other, the center of distortion results from a line which runs through the center of curvature of each of the partial elements. The distortion behavior of an optical element may increase, e.g., continuously with a distance to the center of distortion to the border of the optical element or may increase or also decrease, e.g., only sectionally over the distance from the center of distortion.

The partial portion taken from the image data on the image sensor has a certain geometry as thought limitation which varies dependent on the position of the image section on the image sensor for compensating and at least partially reducing, respectively, the distortion behavior of the optical element. The geometry and thought limitation of the image section depicted and recorded, respectively, on an image sensor of an image capture unit, thus, is dependent on the position where the image section is taken on the image sensor. For instance, if a rectangular portion is taken as image section, this portion has side lengths P1 and P2 at a first capture position, whereas it has the side lengths P1' and P2' at another capture position on the image sensor, wherein P1≠P1' and/or P2≠P2'. In addition or alternatively, the side lengths P1 and P1' and/or P2 and P2' may be angled to each other and may be not parallel. Furthermore, it is possible to take, e.g. a rectangular image section at a position, whereas, at another position, a non-rectangular, e.g., rhombical image section is taken.

The above-described view system is, in particular, advantageous in use with commercial vehicles which have a tractor and a trailer. With commercial vehicles which have a tractor and a trailer, the image section has to be tracked during driving situations, such as cornering, in which the trailer rotates and pivots, respectively, relatively to the tractor and keeping of the image section would result in that the trailer side wall is shown on the monitor to the driver, such that the driver may always reliably view the vehicle environment. In accordance with the present invention, tracking may occur image per image, wherein the geometry of each of the images is adapted in view of the former image. With tracking of an image section, thus, a suitable number of images is generated, for instance, one image per pixel change, which differ from each other dependent on the respective position of the image on the image sensor in their geometry, and is subsequently shown on the monitor to the driver such that the driver has the impression that the original image section is displaced dependent on the rotating angle of the trailer to the tractor. Actually, the displacement corresponds, however, only to a number of takings of separate image sections on/off the image sensor, which differ geometrically from each other. The number of image sections depends on the amount of rotation of the trailer to the tractor and may either be manually controlled by the driver (by pressing or holding a button, a selection on a touch pad, etc.) or via signals of various sensor devices (rotation angle sensor, turn signal etc.).

Preferably, the partial portion is defined at a taking position as a reference partial portion with a reference geometry. This reference geometry may be located at each arbitrary position on the image sensor, i.e., the associated taking position may be located at each position on the image sensor. The reference geometry is a geometry, which is, i.e., prescribed by the manufacturer of the view system, however, may also be determined by the driver or the control unit dependent on the reproduction requirements (e.g. driver specific or legal prescriptions).

Preferably, the partial portion is defined as a reference partial portion where the distortion is small, in particular, e.g., if the partial portion of the image sensor is taken from the image sensor in the vicinity of a position, which corresponds to the depiction of the center of distortion of the image capture unit on the image sensor. For example, the partial portion of the image sensor is taken at a position or directly adjacent to a position, which corresponds to the depiction of the center of distortion, e.g., the optical axis, of the image capture unit on the image sensor. The term "in the vicinity of", thus, describes a position of the partial portion such that the partial portion comprises the depiction of the center of distortion of the image capture unit on the image sensor and has at least one point in common with the depiction of the center of distortion of the image capture unit on the image sensor. Thus, the reference partial portion corresponds to a partial portion of the image sensor which is depicted to the driver on the image reproduction unit distortion-free to the greatest possible extent due to its proximity to the depiction of the center of distortion of the image capture unit on the image sensor without the necessity for a compensation of the distortion behavior of the optical element. The reference partial portion, thus, corresponds to a partial portion of the image sensor which is arranged at a position on the image sensor where the image data captured by the optical element of the environment of the vehicle have no or only a minimal distortion which do not require compensation.

According to a preferred embodiment, the reference geometry of the reference partial portion is a rectangle with a width and a length. However, it is also conceivable that the reference geometry is quadratic, triangular, polygonal, approximately circular, oval, elliptical, etc. The selection of that geometry may, e.g., dependent on the shape of the objects which are located in the vehicle environment or may be dependent on the geometry of the image reproduction unit. The reference geometry may either be determined for the view system to a single geometry or may be changed dependent on the requirements, which have to be fulfilled by the view system, parameters (e.g. the resolution), which require a suitable depiction of the vehicle environment, etc. The reference geometry, thus, may be dependent on parameters of the view system. If a plurality of partial portions is taken, the partial portions may have different geometries, such as a rectangle, a rhomb, a circle, etc.

If the partial portion is located distal to the position, which corresponds to the depiction of the center of distortion of the image capture unit on the image sensor, the partial portion may have a geometry and thought limitation, respectively, which is rotated and/or distorted and/or scaled in view of the reference geometry. For instance, the partial portion may be inclined and tilted, respectively, with a rotation on the image sensor in view of the reference geometry, such that there is a smaller or larger angle between a side surface of the partial portion and a thought line which runs horizontally on the image sensor than between the corresponding side surface of the reference portion and the thought line which runs horizontally on the image sensor. With a distortion, the ratio of the dimensions of the partial portion no longer matches with the ratio of the dimensions of the reference portion and the partial portion has other proportions than the reference portion. With a scaling, the size of the partial portion changes by keeping the proportions. Preferably, the degree of the rotation and/or the distortion and/or the scaling of the reference geometry increases with increasing distance to the depiction of the center of distortion of the image capture unit on the image sensor at least partially, in particular, when a rotationally symmetric distortion to be taken from the center of distortion is existent. In other words, the rotation and/or distortion and/or scaling of the reference geometry becomes larger and higher, respectively, with continuously proceeding distortion, i.e., generally the further the partial portion is spaced apart of the depiction of the center of distortion of the image capture unit. Or the rotation and/or distortion and/or scaling of the reference geometry becomes larger and higher, respectively, with discontinuously proceeding and sectional distortion, respectively, in the distorted portions.

Alternatively, the degree of rotation and/or distortion and/or scaling of the reference geometry decreases with increasing distance from the center of distortion of the image capture unit, if a high distortion attenuates again despite increasing distance to the depiction of the center of distortion on the image sensor, that is, when the distortion firstly increases with increasing distance to the depiction of the center of distortion on the image sensor and then with further increasing distance to the depiction of the center of distortion on the image sensor decreases again. The degree of rotation and/or distortion and/or scaling of the reference geometry, thus, is preferably dependent on the degree of distortion and the distortion behavior of the optical element, respectively.

Preferably, the determination of a first dimension of the geometry of the partial portion occur in a first spatial direction. The determination of a first, for instance, horizontal dimension and, thereby, an adaption of the first dimension may be sufficient for a compensation of the distortion behavior of the optical element dependent on the extent of the distortion, the position of the corresponding partial portion on the image sensor, etc. However, it may be required that a determination of a second, for instance, vertical, dimension of the geometry of the partial portion is required. The determination of the second dimension, then, may occur in a second spatial direction, wherein the first and the second spatial direction run preferably perpendicular to each other.

Preferably, the geometry of the partial portion is determined by means of a calculation algorithm or is determined in advance.

The calculation algorithm uses, for example, at least one compensation curve with which the width and/or the length of the partial portion on the image sensor are determined dependent on a change in position of the depiction angle of the image capture unit corresponding to the partial portion. Two compensation curves for the determination of the height and the width of the partial portion are also conceivable. Likewise, three or more compensation curves for the additional determination of a required rotation angle are also conceivable. Alternatively, the determination of the rotation angle may occur via a vector field, wherein a coordinate is associated to, e.g., each sensor pixel based on the depiction function of the optic with a distortion curve and the inclination angle of the camera for the vehicle environment depicted on the sensor. Further alternatively, the determination of the rotation angle may occur by means of a mathematical function. The partial portion taken from the image sensor corresponds to a portion of the vehicle environment, which is captured by the image capture unit with a certain depiction angle. The depiction angle is an angle, which falls in the view angle of the capture unit and, thus, is smaller than the view angle of the capture unit. The view angle of the capture unit corresponds to the maximum possible angle with which the image capture unit may capture image data and is dependent on the design of the optical element. The part of the vehicle environment corresponding to the view angle of the image capture unit may be depicted as image data on the entire sensor surface. Dependent on the taking position of the partial portion on the image sensor, also the position of the depiction angle changes. The depiction angle, thus, pivots over the view angle portion of the image capture unit, wherein the optical element forms the center of rotation, around which the depiction angle pivots and rotates, respectively. For example, the depiction angle may change its position only to a small extent, and, thus, may be pivoted only around a few degrees within the view angle portion around the center of rotation. However, it is also possible that the position of the depiction angle extremely changes. Then, the depiction angle pivots for many degrees within the view angle portion around the center of rotation.

Preferably, the compensation curve may correspond to a non-linear curve and/or at least one mathematical function. As mathematical function, a step function, an exponential function, a logarithmic function, etc. may come into consideration. In particular, with using a step function as compensation curve, no continuous compensation of the distortion behavior of the optical element occurs, but merely a stepwise compensation. That is, the rotation, distortion and/or scaling of the reference partial portion occurs stepwise dependent on where the partial portion is taken from the image sensor surface. In other words, the geometry of the reference portion changes at two adjacent, but spaced apart positions on the image sensor, whereas between these positions, however, no change of the geometry occurs. This substantially reduces the computing power of the image processing unit.

Alternatively, the compensation curve may correspond to a freely defined curve whose values, for example, are determined empirically and are stored in the processing unit. Specifically, empirical values and measured values, respectively, concerning the rotation and/or distortion and/or scaling of the reference portion in relation to the position of the partial portion on the image sensor are associated to each point on the compensation curve and are stored in a database such that the calculation algorithm selects the corresponding values from the database during compensation of the distortion behavior of the optical element and applies these values to the geometry of the reference portion.

Alternatively, the compensation curve may correspond to the distortion curve of the optical element. Thus, an adaption of the reference geometry, which is directly proportional to a distortion behavior of the optical element occurs in this case. According to a preferred embodiment, the compensation curve additionally corresponds to a distortion curve of the optical element which has been subjected to a digital distortion correction.

Preferably, the depiction angle, which corresponds to the reference portion, and the depiction angle, which corresponds to the partial portion, are of the same size. However, it is also conceivable that the compensation of the distortion behavior of the optical element occurs such that the reference geometry does not change in the extent as this is the case, if the angles were of the same size, but only changes in the extent that a compensation nevertheless occurs in case of angles which differ from each other.

Preferably, the partial portion comprises the field of view of a main mirror and/or a wide angle mirror of a commercial vehicle. For example, the field of view of the main mirror and/or the wide angle mirror corresponds to the fields of view II and IV, respectively, as they are defined in the UN/ECE-regulation number No. 46.

The portion of the image sensor, which is determined by the image capture unit such that it is to be shown on the reproduction unit is either realized by a single partial portion or by two or more continuously adjacent to each other partial portions. The two or more continuously adjacent to each other partial portions may have different geometries during the taking (dependent on the position of the taking) and are re-jointed or are shown in two different portions on the reproduction unit during their reproduction on the image reproduction unit.

The image data are preferably processed before they are reproduced on the image reproduction unit by the image processing unit and/or a further image processing unit, e.g., with respect to color saturation, contrast, resolution, overexposure and underexposure, haziness, image noise, etc.

A further aspect of the present invention relates to a mirror replacement system for a vehicle with a view system as described above.

Within a mirror replacement system, the view system may, e.g., be used such that dependent on a driving state of the vehicle a certain partial portion which is associated to the driving condition is taken and shown on the reproduction unit. Alternatively or additionally, it is conceivable that a certain partial portion is taken and shown as a standard, the driver, however, may only in particular driving conditions manually switch to the taking of another partial portion.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention is exemplarily described with reference to the enclosed figures, in which.

DETAILED DESCRIPTION OF THE FIGURES

Figure 1:
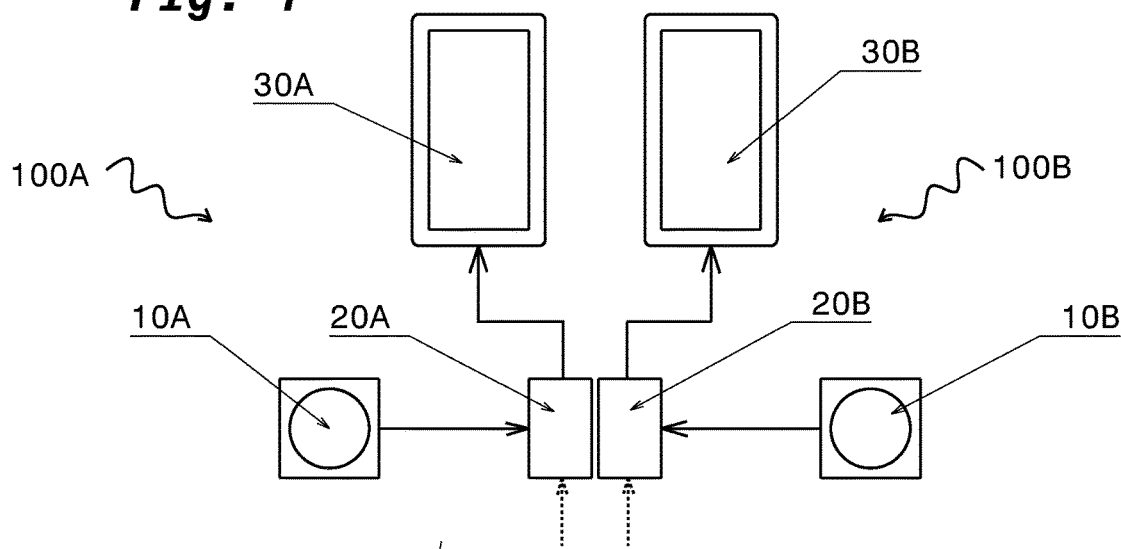
FIG. 1 shows a schematic structure of two view systems according to an embodiment of the invention.

FIG. 1 shows a schematic structure of two view systems 100A, 100B according to an embodiment of the present invention, which, for example, form a view system 100A for the left vehicle side and a view system 100B for the right vehicle side. Each of the view systems 100A, 100B has a capture unit 10A, 10B, a processing unit 20A, 20B and a reproduction unit 30A, 30B. Thus, each of the view systems 100A, 100B corresponds to an indirect view system such as a camera monitor system, and, thus, a mirror replacement system with which the environment around a vehicle may be indirectly viewed.

Each of the capture units 10A, 10B is adapted to capture/record images of an environment around a vehicle, in particular, a commercial vehicle, in the form image data. In this respect, the capture unit 10A, 10B is attached to the vehicle in a suitable manner. The capture unit 10A, 10B may be a camera, in particular, a camera with a sensor according to a CMOS or CCD technology, or any other image sensor which is suitable to capture moved images. A plurality of capture units 10A, 10B may be provided per view system 10A, 10B. The capture unit 10A, 10B communicates with a respective one of the processing units 20A, 20B, such as via connection wires or radio communication.

The corresponding one of the processing units 20A, 20B is adapted to process the image data captured by the capture unit 10A, 10B. In this respect, the processing unit 20A, 20B uses predetermined parameters, such as the resolution, the contrast, the color saturation, the color temperature and the color tones, the exposure time, etc., and changes these or other parameters, in particular for the purpose of optimization of the image depicted on the reproduction unit 30A, 30B.

The corresponding one of the reproduction units 30A, 30B is adapted for showing/reproducing images which are captured by the corresponding one of the capture units 10A, 10B and which are processed by the corresponding one of the processing units 20A, 20B. The reproduction unit 30A, 30B may be a monitor, such as a LCD, TFT or LED monitor. A plurality of reproduction units 30A, 30B may be provided per view system 100A, 100B. The reproduction units 30A, 30B are preferably installed inside a driver's cabin of a vehicle, further preferably on one or both A-columns of a vehicle, such that they may be viewed in an unhindered manner by a driver during driving.

Figure 2A:
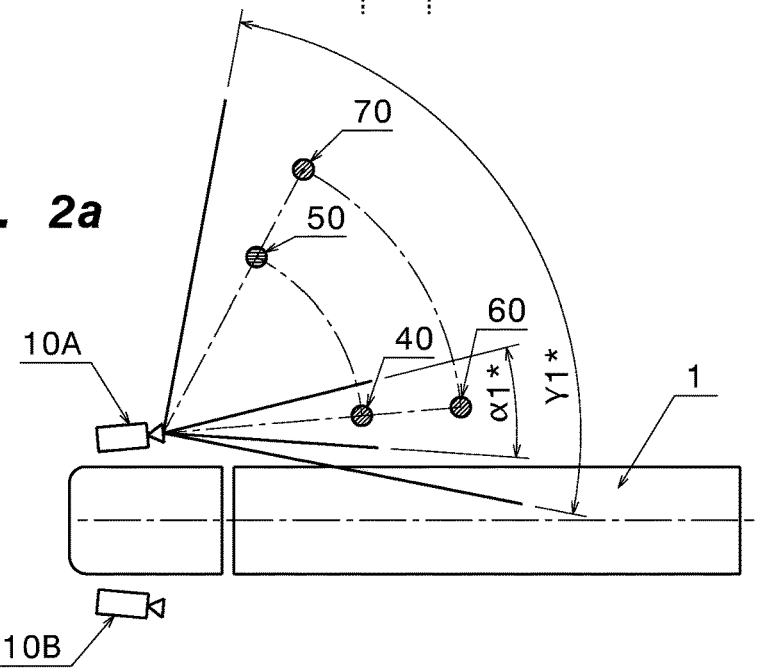
FIG. 2a shows a plan view of a commercial vehicle which uses the view system of FIG. 1.

FIG. 2a shows a plan view of a commercial vehicle 1. Presently, the commercial vehicle 1 is a truck/heavy goods vehicle (HGV) which has a tractor and a semi-trailer or a trailer. At each of the front left and right side of the driver's cabin of the tractor in driving direction of the truck, a camera 10A, 10B is attached. As shown in FIG. 2a, the camera 10A captures a portion of the environment, which lies on the right adjacent to the rear part of the tractor and adjacent to the trailer and the semi-trailer, respectively, as viewed in the driving direction of the truck. Even if not shown in FIG. 2a, the camera 10B is configured in accordance with the camera 10A to monitor a portion of the environment, which lies on the left adjacent to the rear part of the tractor and adjacent to the trailer and the semi-trailer, respectively, as viewed in the driving direction of the truck. Each of the right and the left portion of the environment, is captured by the respective camera 10A, 10B with a first angle of view γ1, wherein in FIG. 2a the projection γ1* of the angle of view can be seen which spans horizontally, i.e., approximately parallel, to a plan road surface.

On the right adjacent to the trailer of the truck, four objects 40, 50, 60, 70 are located. The objects 40, 50, 60, 70 lie within the projection γ1' of the first angle of sight of the camera 10A and, thus, are captured by the camera 10A. The objects 40, 50, 60, 70, for example, may be an obstacle in the form of an item, such as a further vehicle or a pillar or a person. Each of the objects 40 and 50 and the objects 60 and 70, respectively, lies on a circular arc whose center is located at the position of the camera 10A. In other words, the objects 40 and 50 and the objects 60 and 70, respectively, have the same distance (radius) to the camera. The objects 40 and 60, in doing so, lie closer to the vehicle 1 than the objects 50 and 70.

In the driving situation shown in FIG. 2a, the objects 40 and 60 are located in the projection α1* of a first depiction angle α1. The first depiction angle α1 corresponds to an angle which is smaller than the first angle of view γ1 of the camera 10A, lies within the first angle of view γ1 and whose image data (from the entire image data of the capture angle γ1) are shown to the driver on a reproduction unit (not shown in FIG. 2a).

Figure 2B:
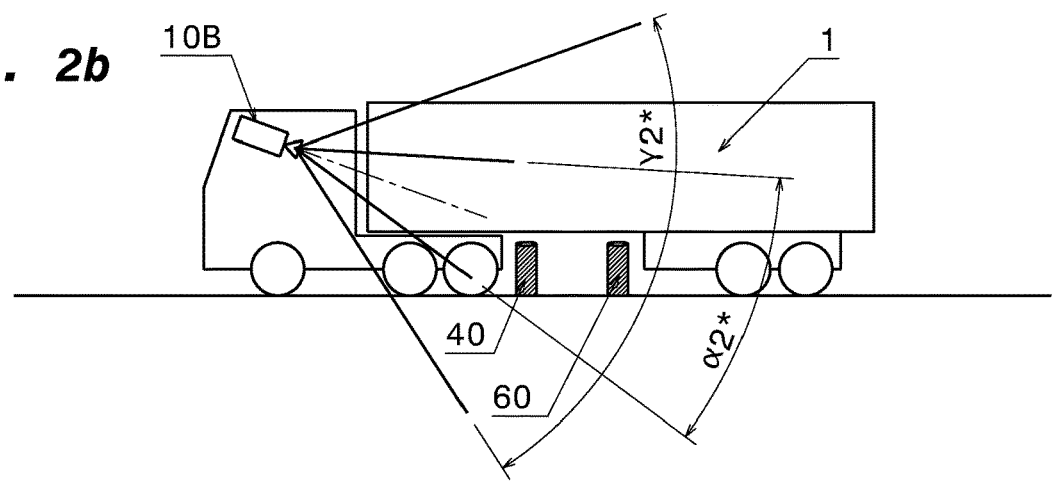
FIG. 2b shows a side view of the commercial vehicle of FIG. 2a, which uses the view system of FIG. 1.

FIG. 2b shows a side view of the truck of FIG. 2a. As shown in FIG. 2b, the capture region of the camera 10B (as well as the capture region of the camera 10A) extends not only horizontally to the rear, but also obliquely downwards to the rear, such that FIG. 2b shows a projection γ2* of a second angle of view γ2 of each of the cameras 10A, 10B. The second angle of view γ2 extends perpendicular to the plane in which the first angle of view γ1 of the camera 10A is located, and expands rearwards. By the first and second angles of view γ1 and γ2, each of the cameras 10A, 10B spans a respective capture cone, which expands starting from the respective camera 10A, 10B downwards to the rear.

As further shown in FIG. 2b, the objects 40, 50, 60 and 70 (objects 60 and 70 are not shown in FIG. 2b) lie within the second angle of view γ2 of the camera 10A and, specifically, are located in a second depiction angle α2, which corresponds to an angle which is smaller than the second angle of view γ2 of the camera 10A, lies within the second angle of view γ2 and whose image data (from the entire image data of the angle of view γ2) are shown to the driver on a reproduction unit (not shown in FIG. 2b).

As can be taken from FIGS. 2a and 2b, the objects 40, 50, 60 and 70 have, as an example, an approximately cylindrical shape whose longitudinal axis runs in a direction perpendicular to the road surface, and are assumed to have the same size for sake of explanation.

Figure 2C:
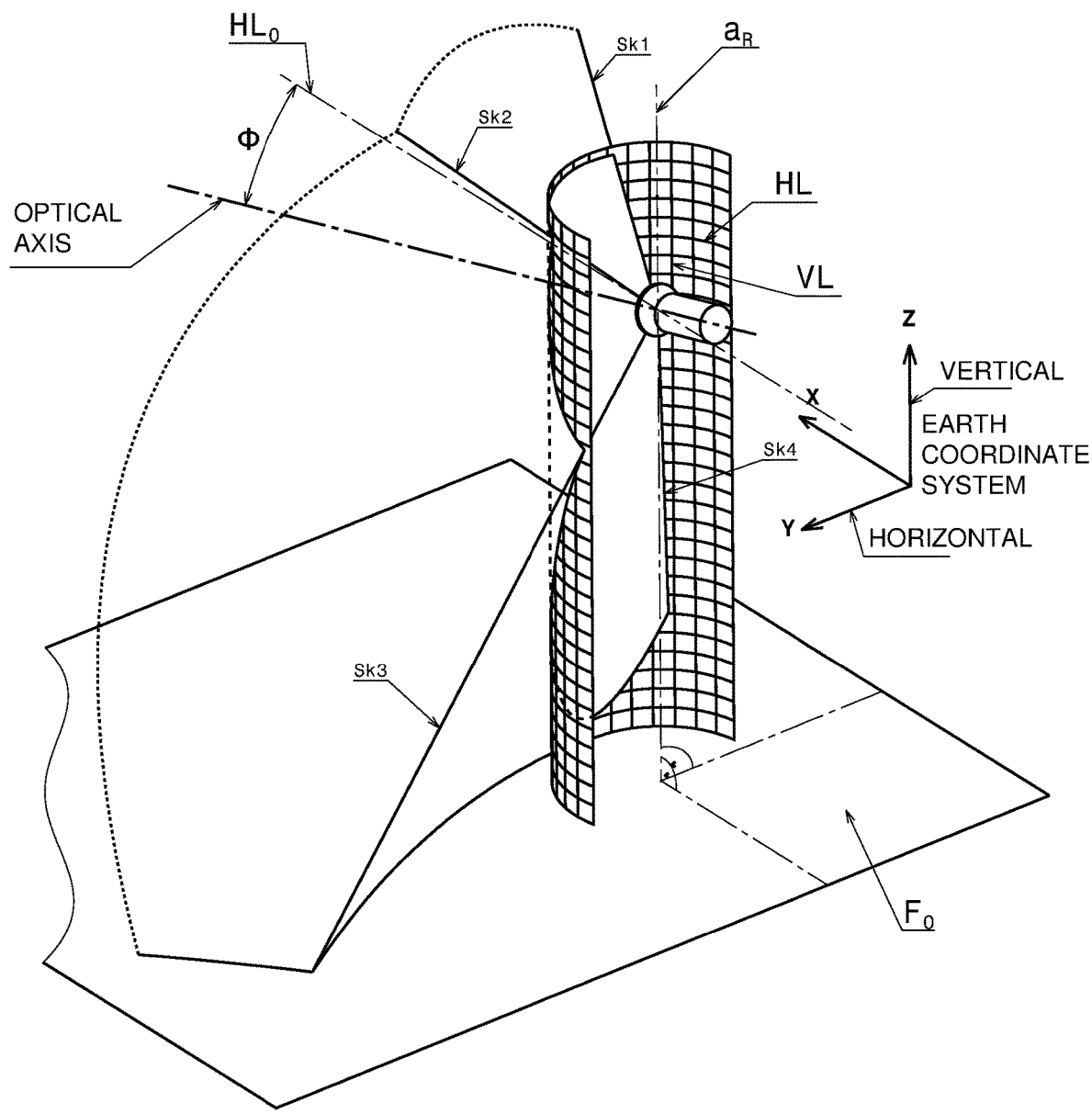
FIG. 2c shows a three-dimensional field of view of a camera.

In FIG. 2c, a three-dimensional field of view of a camera, such as the camera 10A or 10B of FIGS. 1a and 1b, respectively, is exemplarily shown in an earth axes system (coordinate system X-Y-Z). The camera captures a three-dimensional field of view which is limited by the edges of the field of view Sk1, Sk2, Sk3 and Sk4. The optical axis of the camera runs obliquely downwards, if the road surface FO is assumed as reference surface. Specifically, the optical axis runs in an inclination angle φ to the horizontal line $HL_O$, which runs through the first main point of the optic.

As shown in FIG. 2c, the image data, such as the environment of a vehicle, are captured by the camera in the form of an imaginary cylindrical grid pattern. The cylindrical grid pattern has vertical net lines VL and horizontal net lines HL which run perpendicular to the vertical net lines. The horizontal line $HL_O$ which runs through the main point of the optic has an intersection point with an axis of rotation $a_R$ of the grid pattern which runs in the vertical direction Z through the center of the cylinder cross section.

FIG. 3 shows a plan view of a camera 10 of the view system according to the invention similar to FIG. 2a. In contrast to FIG. 2a, in the scenario of the vehicle environment shown in FIG. 3a, not only the objects 40 and 60 are arranged in a first depiction angle α1 of the camera 10A, but also the objects 50 and 70 are arranged in a first depiction angle α1' of the camera 10. The first depiction angles α1 and α1' are approximately of the same size, i.e., they have approximately the same angle extension. The first depiction angles α1 and α1' lie both within the first angle of view γ1 (not shown) of the camera 10.

Figure 3A:
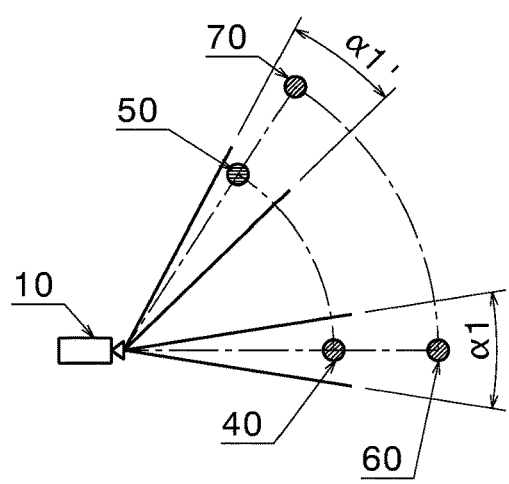
FIG. 3a shows a plan view of a first and a second depiction angle which are captured by a vehicle camera of the view system according to the invention in accordance with a first embodiment.
Figure 3B:
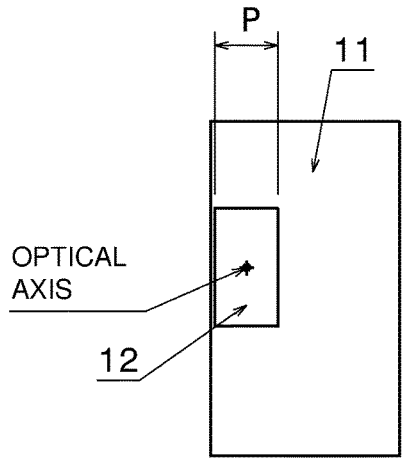
FIG. 3b shows an image sensor of the view system according to the invention in accordance with the first embodiment, on which a first partial portion is defined.

FIG. 3b shows an image sensor 11 of the view system according to the invention. The image sensor 11 has a rectangular shape with a longer extension in an up and down direction than in a right and left direction of FIG. 3b. In the vicinity of the left edge of the image sensor 11 shown in FIG. 3b, a first partial portion 12 is defined as taking portion. As shown in FIG. 3b, the partial portion 12 comprises the depiction of the optical axis of the camera 10. The first partial portion 12, has a rectangular shape whose longitudinal extension runs in an up and down direction in FIG. 3b and whose width extension runs in a left and right direction in FIG. 3b. The first partial portion 12 has a width P in the width extension. The first partial portion 12 corresponds to the image data which are located in the depiction angle α1 and may, for example, comprise the field of view of a main mirror and/or a wide angle mirror (e.g., the fields of view II and IV as defined in the ECE R 46). Such a partial portion 12 lying in the vicinity of the depiction of the optical axis in which the distortion is preferably low, as it is located here, e.g. in the vicinity of the optical axis, may be a reference portion.

Figure 3C:
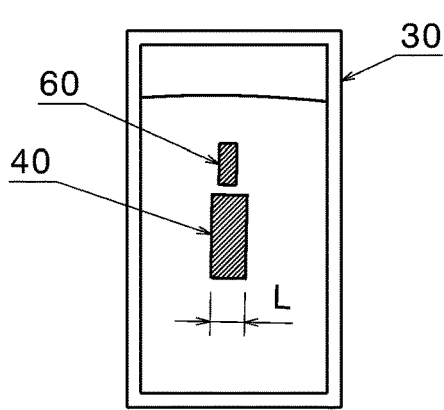
FIG. 3c shows a monitor of the view system according to the invention in accordance with the first embodiment, on which the first partial portion is depicted.

FIG. 3c shows a monitor 30 (image reproduction unit) of the view system according to the invention. The monitor 30 has a rectangular shape with a longer extension in an up and down direction than in a left and right direction of FIG. 3c. The monitor 30 depicts the first partial portion 12 and the first partial portion 12 is shown on the monitor 30, respectively. In this respect, the depiction surface of the monitor 30 substantially corresponds to the surface of the partial portion 12. On the monitor 30, image data of the vehicle environment are reproduced, which are located in the depiction angle α1 and, thus, the first partial portion 12. In particular, the objects 40 and 60 are reproduced on the monitor 30.

As shown in FIG. 3c, the objects 40 and 60 are reproduced on the monitor 30 in an almost distortion-free manner and only have different sizes in the representation, since there are located in different distances to the camera 10 in the vehicle environment. Specifically, the object 40 is located closer to the camera 10 than the object 60, why it is represented larger on the monitor 30 than the object 60, and the object 60 is located further away from the camera 10 than the object 40, why it is represented smaller on the monitor 30 than the object 40. As the driver recognizes objects in different distances in the vehicle environment also in different sizes (the further away from the driver, the smaller), thus, a realistic reproduction of the vehicle environment occurs for the driver. The object 40 has a length L, which extends in a left and right direction on the monitor 30. The almost distortion-free reproduction of the objects 40 and 60 is constituted in that the objects 40 and 60 are located directly on the center of distortion and in its direct vicinity, respectively, here the optical axis of the camera 10 and the optical element (not shown), respectively, where the distortion behavior of the optical element, which is presently barrel-shaped, is very low. At the position of the first partial portion 12 on the image sensor 12, thus, no compensation of the distortion behavior of the optical element is required and the objects 40 and 60 may be represented on the monitor 30 in an unchanged manner with regard to the compensation of the distortion. The same may also still apply, if the partial portion taken from the image sensor 11 does not comprise the center of distortion, but is directly adjacent thereto and/or contacts the center of distortion. The proportions of the height to the width of the objects 40 and 60 on the monitor 30 approximately correspond to the proportions of the height to the width of the objects 40 and 60 in reality.

FIG. 3d shows again the image sensor 11 of FIG. 3b. In contrast to FIG. 3b, in FIG. 3d a further, second partial portion 12' is defined next to the right edge of the image sensor 11 which is located in another position on the image sensor 11 than the partial portion 12. The partial portion 12' does not comprise the depiction of the optical axis of the camera 10, but is rather arranged distally to the optical axis and the center of distortion, respectively. As the first partial portion 12, also the second partial portion 12' has a rectangular shape whose longitudinal extension runs in an up and down direction in FIG. 3d and whose width extension runs in a left and right direction in FIG. 3d. The second partial portion 12' has a width P' in the width direction which is changed in view of the width P of the first partial portion 12. The second partial portion 12' corresponds to the image data which are located in the depiction angle α1' and may also comprise the field of view of a main mirror and/or a wide angle mirror (e.g., the fields of view II and IV as defined in the ECE R 46).

FIG. 3e shows again the monitor 30 of FIG. 3c. The monitor 30 now reproduces the second partial portion 12'. In this respect, the depiction surface of the monitor 30 approximately corresponds to the surface of the partial portion 12'. On the monitor 30, the image data of the vehicle environment are reproduced which are located in the depiction angle α1' and, thus, the first partial portion 12'. In particular, the objects 50 and 70 are reproduced on the monitor 30.

Preferably, only one monitor 30 is provided for each vehicle side. In order to view the different partial portions 12 and 12', the driver may either manually shift a view which shows the partial portion 12 to a view which shows the partial portion 12', or the shifting of the views occurs dependent on the driving situation. Alternatively, however, also more than one monitor 30 may be provided for more than one vehicle side. That is, for example, two monitors 30 may be provided, the first monitor 30 showing the partial portion 12 and the second monitor (not shown) showing the partial portion 12'.

Figure 3D:
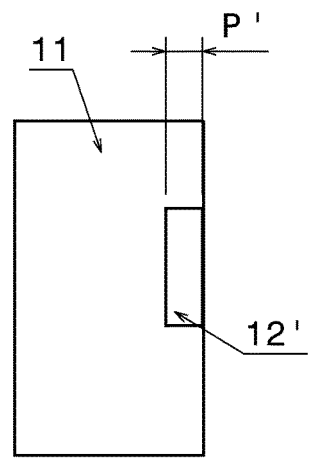
FIG. 3d shows an image sensor of the view system according to the invention in accordance with the first embodiment, on which a second partial portion is defined.
Figure 3E:
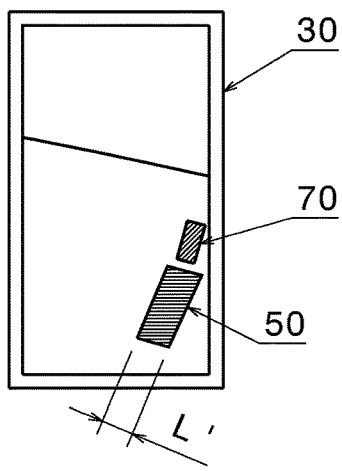
FIG. 3e shows the monitor of the view system according to the invention in accordance with the first embodiment, on which the second partial portion is depicted.

As shown in FIG. 3e, the objects 50 and 70 have different sizes, since they are located in different distances to the camera 10 in the vehicle environment. Specifically, the object 50 is located closer to the camera 10 than the object 70, why it is represented larger on the monitor 30 than the object 70, and the object 70 is located further from the camera 10 than the object 50, why it is represented smaller on the monitor than the object 50, which leads to a realistic reproduction of the vehicle environment for the driver. The proportions of the objects 50 and 70, i.e., the width and the height of the objects 50 and 70, respectively, correspond on the monitor 30 in a substantial distortion-free representation, approximately to the proportions of the objects 50 and 70, i.e., the width and the height of the objects 50 and 70, in reality.

The objects 50 and 70 are reproduced on the monitor 30 of FIG. 3e almost distortion-free, i.e. approximately in the same size and shape as the objects 40, 60. The almost distortion-free reproduction of the objects 50 and 70 is constituted in that the partial portion 12' has a changed geometry in view of the partial portion 12. Specifically, the partial portion 12' has a smaller width P' than the width P of the partial portion 12. The reduction of the width P of the partial portion 12, if taken from the image sensor 11 on or next to the depiction of the optical axis as the center of distortion, to the width P' of the partial portion 12' serves for compensation of the distortion behavior of the optical element. In other words, the distortion behavior of the optical element may be compensated or at least reduced in that the geometry, e.g., at least a side length of the partial portion 12' taken from the image sensor 11 is changed dependent on the taking position in view of the geometry of the partial portion 12 which is located on or next to the depiction of the optical axis as the center of distortion on the image sensor or generally in another portion of the image sensor 11. Dependent on the kind of the distortion behavior of the optical element, in this respect, e.g., a reduction or an enlargement of the geometry of the partial portion 12 is required. The width of the object 50 represented on the monitor has a width L' which extends substantially in a left and right direction on the monitor 30 and the proportions of the object 50 and the object 40 on the monitor 30 are approximately equal to the proportions of the object 50 and the object 40 in reality, in case of a substantially distortion-free representation.

Figure 3F:
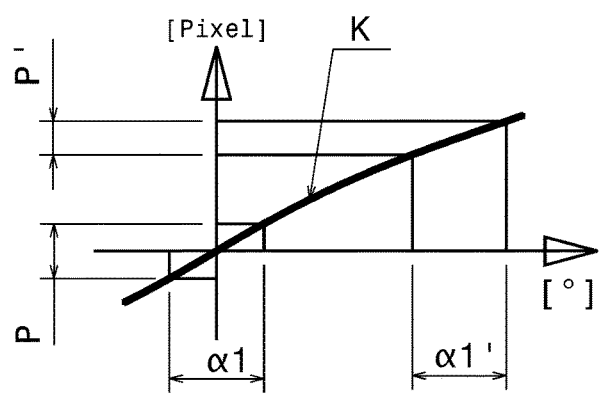
FIG. 3f shows a compensation curve of the camera of the view system according to the invention in accordance with the first embodiment.

In FIG. 3f, the compensation curve K of the camera 10 and the optical element (not shown) of the camera 10 is shown in a diagram. In the diagram, an angle extension in degree [°] is indicated on the abscissa and the length extension in pixels is indicated on the ordinate. The compensation curve K is a curve which runs through the point of origin (which represents the center of distortion, such as the optical axis) and extends non-linear upwards to the right in FIG. 3f wherein its development with increasing distance to the point of origin slightly flattens. In FIG. 3f, the compensation curve K corresponds to the distortion curve of the optical element. However, it is also conceivable that the compensation curve K corresponds to a freely defined curve which is empirically detected and is stored in the processing unit 20A, 20B. Alternatively, the compensation curve may correspond to at least one mathematical function.

The compensation curve K is used by the image processing unit 20A, 20B for determining the widths P, P' of the partial portions 12, 12' on the image sensor 11 dependent on a change in position of the depiction angle α1, α1' of the camera 10 corresponding to the partial portion 12, 12'. In other words, the image processing unit 20A, 20B may determine by use of the compensation curve K which width P, P' the partial portion 12, 12' taken from the image sensor 11 has dependent on the displacement of the corresponding depiction angle α1, α1' and, thus, dependent on the position on the image sensor 11. The compensation of the vehicle environment shown in FIG. 3f, refers to a compensation in a first spatial direction which presently corresponds to a horizontal spatial direction parallel to the road surface.

In the diagram of FIG. 3f, the angles α1, α1' of FIG. 3a and the width dimensions P, P' of the partial portions 12, 12' of FIGS. 3b and 3d are indicated. In order to compensate a distortion, the geometry of the partial portions 12, 12', thus, is dependent on where they are taken from the image sensor surface. Therefore, the geometries of the partial portions 12, 12' differ from each other. As it is shown in FIG. 3f, the width P, P' of the partial portions 12, 12', for example, decreases with increasing angle extension, while the angles α1, α1' stay equal. However, it is also conceivable that the angles α1, α1' also slightly change dependent on the position of the partial portion 12, 12', where upon the corresponding width P, P' of the respective partial portion 12, 12' changes as well, however, not to the extent as if their angles α1, α1' do not change.

As it is shown in FIGS. 3c and 3e, the objects 40 and 60 and the objects 50 and 70, respectively, are represented on the monitor 30 in a hardly or merely slightly distorted manner. By the hardly or merely slightly distorted representation of the objects 40 and 60 and 50 and 70, respectively, on the monitor 30 the driver may well recognize the size of the objects 40 and 60 and 50 and 70 as well as their position and orientation in the vehicle environment. Thus, the driver may reliable assess whether the truck collides with one or more with the objects 40, 50, 60 and 70 during the planned driving manoeuver or not.

Figure 4A:
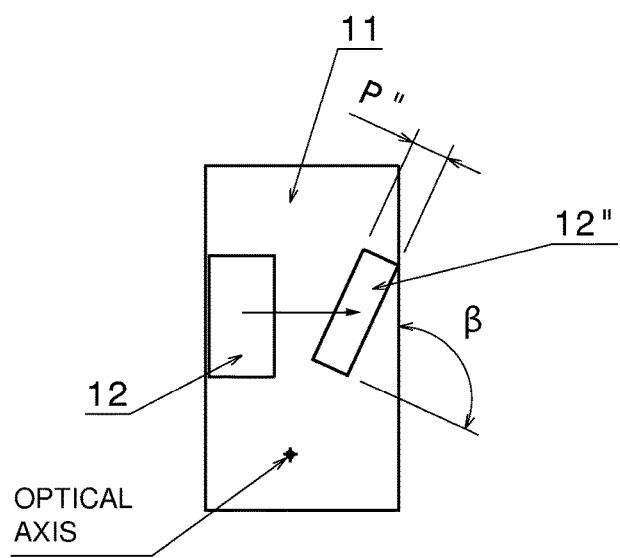
FIG. 4a shows the image sensor of the view system according to the invention in accordance with the first embodiment, on which the second partial portion is modified.

FIG. 4a shows again the image sensor 11 of FIG. 3b. A partial portion 12" is taken from the image sensor 11 which substantially corresponds to the partial portion 12' of FIG. 3d. In particular, the width P" corresponds to the width P1' of the partial portions 12' of FIG. 3d. In FIG. 4a, however, the position of the partial portion 12" is changed in view of the position of the partial portion 12' of FIG. 3d. Specifically, the partial portion 12" in FIG. 4a is tilted and rotated, respectively, to the right in view of the partial portion 12', such that the upper edge of the partial portion 12", which runs in the width direction of the partial portion 12", has an orientation angle β to the edge of the image sensor 11 which is larger than 90°. In other words, in the partial portion 12", the longitudinal axis does not extend in an up and down direction as in FIG. 3d, but extends in FIG. 4a in an angular manner to the up and down direction and the boundaries of the partial portion 12' are not parallel to the ones of the also rectangular image sensor 11.

Figure 4B:
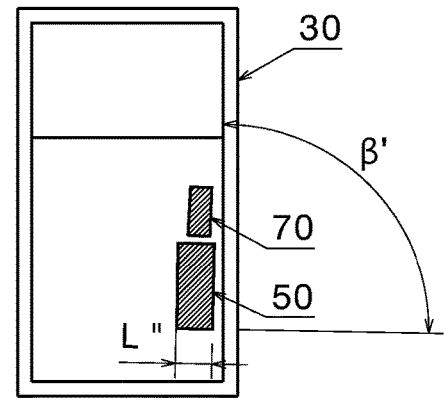
FIG. 4b shows a monitor of the view system according to the invention in accordance with the first embodiment, on which the modified partial portion is depicted.

FIG. 4b shows the monitor 30 of the view system according to the invention which substantially corresponds to the monitor of FIGS. 3c and 3e and reproduces the partial portion 12". As it is shown in FIG. 4b, the objects 50 and 70 which are located in the partial portion 12' are represented further and stronger non-distorted and distortion-free, respectively, such that their longitudinal axes in an up and down direction in FIG. 4b substantially run parallel to the longitudinal edge of the monitor 30. Thus, the width of the objects 50 and 70, respectively, run on the monitor 30 of FIG. 4b in a left and right direction, such that the arrangement angle β' runs approximately perpendicular to the longitudinal edge of the monitor 30. The object 50 has a width L" which extends in a left and right direction on the monitor 30.

By the additional rotation of the partial portion 12" in view of the position of the partial portion 12', the deformation and distortion, respectively, of the objects 50 and 70 may be further reduced and may be entirely eliminated, respectively. By the distortion-free representation of the objects 50 and 60 on the monitor 30, the driver may well recognize the size of the objects 50 and 70 as well as their position and orientation in the vehicle environment. Thus, the driver may assess still more reliably whether the truck collides with the object 50 and/or the object 70 during the planned driving maneuver or not.

In the monitor depictions in FIGS. 3c, 3e and 4b, it applies that each of the ratios of the width dimensions L, L' and L" of the objects 40 and 50 substantially corresponds to the ratios of the width dimensions of the objects 40 and 50 in reality.

FIGS. 5a to 5h show a compensation of the distortion behavior of the camera 10 in two spatial directions. A first spatial direction corresponds to a first spatial direction (see the capture direction of the camera 10A of FIG. 2a) and a second spatial direction corresponds to a second spatial direction which is substantially perpendicular to the first spatial direction (see the capture direction of camera 10B of FIG. 2b).

Figure 5A:
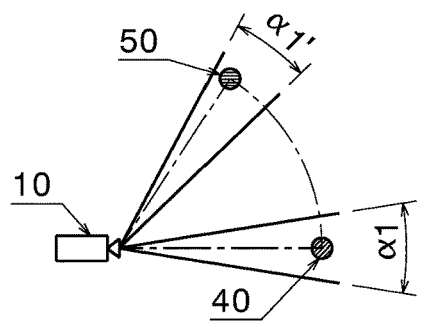
FIG. 5a shows a plan view of a first and a second depiction angle which are captured by a vehicle camera of the view system according to the invention in accordance with a second embodiment.

The driving situation shown in FIG. 5a substantially corresponds to the driving situation shown in FIG. 3a and, thus, corresponds to a plan view of a camera 10 which is attached to a vehicle (not shown) (corresponding to the view in FIG. 2a). In contrast to the driving situation shown in FIG. 3a, only the objects 40 and 50 are located in the angle of view γ1 of the camera 10. The object 40 lies next to the center of distortion whereas the object 50 is located in a distance thereto.

Figure 5B:
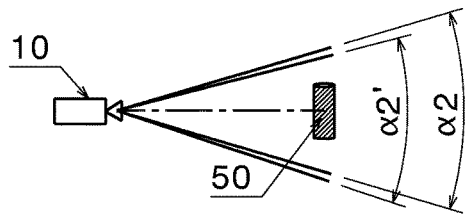
FIG. 5b shows a side view of a first and a section depiction angle which are captured by a vehicle camera of the view system according to the invention in accordance with the second embodiment.

FIG. 5b also shows the driving situation of FIG. 5a, however, from another perspective. Specifically, FIG. 5b shows a side view of the camera 10 and, thus, a side view of the objects 40 and 50 (corresponding to the view in FIG. 2b, object 40 not shown). In this respect, the object 40 is located in a depiction angle α2 and the object 50 is located in a depiction angle α2'. The depiction angles α2 and α2' are smaller than the angle of view γ2 (not shown) and lie within the angle of view γ2.

Figure 5C:
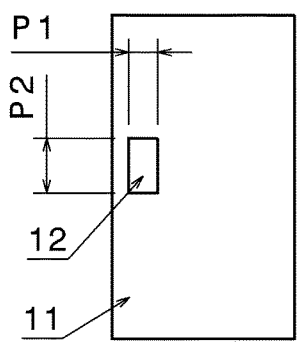
FIG. 5c shows an image sensor of the view system according to the invention in accordance with the second embodiment, on which a first partial portion is defined.

FIG. 5c shows an image sensor 11 similar to the image sensor of FIG. 3b. On the image sensor 11, the partial portion 12 is defined. The image data of the partial portion 12 correspond to the image data of the depiction angles α1 and α2, each of which comprises the object 40. The partial portion 12 has a width P1 in a left and right direction in FIG. 5c which arises from the image data of the depiction angle α1 in a first spatial direction, and a length P2 in an up and down direction in FIG. 5c which arises from the image data of the depiction angle α2 in the second spatial direction. The partial portion 12 may again be considered as the reference partial portion 12 with a substantial distortion-free depiction.

Figure 5D:
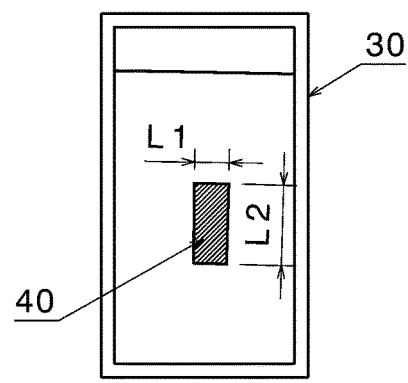
FIG. 5d shows a monitor of the view system according to the invention in accordance with the second embodiment, on which the first partial portion is depicted.

FIG. 5d shows a monitor which has substantially the same construction as the monitor of FIG. 3c and whose monitor surface substantially corresponds to the partial portion 12, the object 40 shown on the monitor 30 is represented in a substantially undistorted manner, because it is located next to the center of distortion of the camera 10, and has a width L1 and a length L2 whose ratio corresponds approximately to the actual ratio of the width and the height of the object 40 in the vehicle environment.

FIG. 5e shows again the image sensor 11 of FIG. 5c. On the image sensor 11, a partial portion 12' is defined. The image data of the partial portion 12' correspond to the image data of the depiction angles α1' and α2', each of which comprises the object 50. The partial portion 12' has a width P1' in a left and right direction in FIG. 5e and a length P2' in a up and down direction in FIG. 5e each of which arises from the image data of the two depiction angles α1' and α2'. Both, the width P1' and the length P2' of the partial portion 12' are changed in view of the width P1 as well as the length P2 of the partial portion 12 of FIG. 5c, because the partial portion 12' is taken at another position on the image sensor 11 than the partial portion 12. By changing the width and the length, respectively, of the partial portion 12 dependent on its position on the image sensor 11, i.e., an adaptation of the geometry of the partial portion 12 in two spatial directions, the distortion behavior of the camera 10 may be compensated in an improved manner than if a compensation merely occurs in one spatial direction.

Figure 5E:
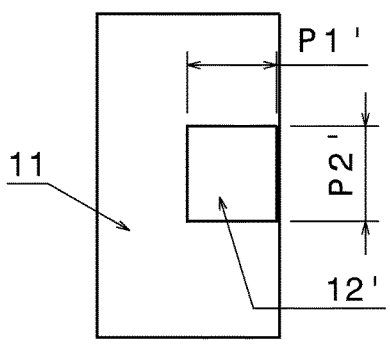
FIG. 5e shows an image sensor of the view system according to the invention in accordance with the second embodiment, on which a second partial portion is defined.
Figure 5F:
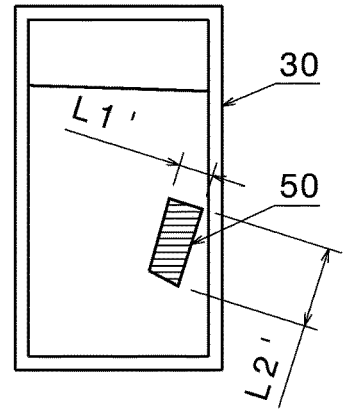
FIG. 5f shows the monitor of the view system according to the invention in accordance with the second embodiment, on which the second partial portion is depicted.

FIG. 5f shows a monitor 30 which has substantially the same construction as the monitor of FIG. 3c and whose monitor surface substantially corresponds to the partial portion 12'. The object 50 shown on the monitor 30 is—although distally arranged from the center of distortion of the camera 10—substantially represented in an undistorted manner and has a width L1' and a length L2' whose ratio approximately corresponds to the actual ratio of the object 40 in that vehicle environment. The approximately distortion-free depiction of the object 50 may be realized by adapting the geometry of the partial portion 12' in view of the geometry of the partial portion 12. The extent and the degree of the adaptation depends on the position of the partial portion 12' and, specifically, depends on the distance of the partial portion 12 from the depiction of the center of distortion on the image sensor 11. By changing of the geometry of the partial portion 12' dependent from the taking position of the partial portion 12' on the image sensor 11, the distortion behavior of the camera which is presently pulvinated may be compensated or at least reduced. Even if not shown, a position change of the partial portion 12' similar to the modification of the first embodiment in FIG. 4a and FIG. 4b, e.g., a rotation, is also conceivable in view of the position of the partial portion 12.

Figure 5G:
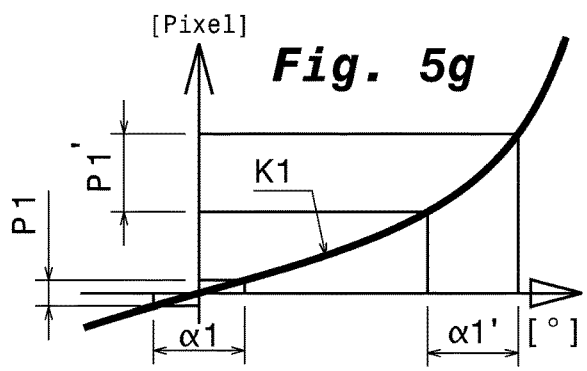
FIG. 5g shows a compensation curve of the image processing unit of the view system according to the invention in accordance with the second embodiment in a first spatial direction.
Figure 5H:
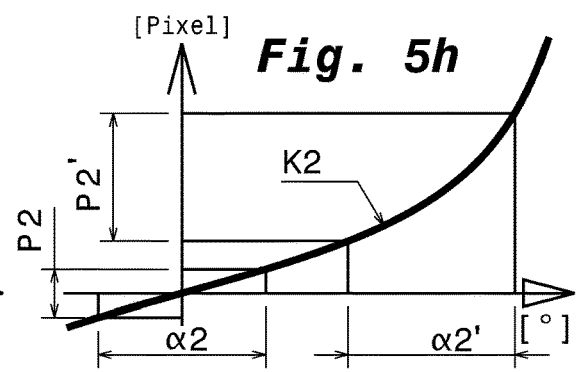
FIG. 5h shows a compensation curve of the image processing unit of the view system according to the invention in accordance with the second embodiment in a second spatial direction, FIG. 5i show an image sensor of the view system according to the invention in accordance with a third embodiment on which two partial portions are defined.

The compensation of the distortion is shown in FIGS. 5g and 5h. In FIGS. 5g and 5h, each of the compensation curves K1 and K2, respectively, of the camera 10 are shown in a diagram. As in the compensation curve K of FIG. 3f, in the diagrams of FIGS. 5g and 5h, an angle extension in degree [°] is indicated on the abscissa and the length extension in pixels is indicated on the ordinate. The compensation curves K1 and K2 are curves which run through the point of origin (which represents the center of distortion) and each of which extends non-linearly upwards to the right in FIGS. 5g and 5h, wherein their progression increases strongly with increasing distance from the point of origin, because the camera 10 has a pulvinated distortion. In FIGS. 5g and 5h, the compensation curves K1 and K2 correspond to the compensation curves of the optical element in the respective spatial direction. The compensation curve K1 shown in FIG. 5g corresponds to the distortion behavior of the camera 10 in the first horizontal spatial direction, whereas the compensation curve K2 shown in FIG. 5h corresponds to the distortion behavior of the camera 10 in the second vertical spatial direction.

The compensation curves K1, K2 are used for determination of the widths P1, P1' of the partial portion 12, 12' on the image sensor 11 dependent on a change in the position of the depiction angle $\alpha 1$, $\alpha 1'$, $\alpha 2$, $\alpha 2'$ of the camera 10 corresponding to the partial portion 12, 12', such that both partial portions 12, 12' may be shown undistorted or approximately undistorted on the monitor 30. In other words, the image processing unit 20a, 20b may determine by means of the respective compensation curve K1, K2, which width P1, P1' and which length P2, P2' the partial portion 12, 12' taken from the respective image sensor 11 has dependent on the displacement of the corresponding depiction angles $\alpha 1$, $\alpha 1'$ and $\alpha 2$, $\alpha 2'$, respectively, and, thus, dependent on the position of the respective partial portion 12, 12' on the image sensor 11.

In the diagrams of FIGS. 5g and 5h, the angles $\alpha 1$, $\alpha 1'$ and $\alpha 2$, $\alpha 2'$ of FIGS. 5a and 5b as well as the width dimensions P1, P1' and the length dimensions P2, P2' of the partial portions 12, 12' of FIGS. 5c and 5e are indicated. As shown in FIG. 5g, the width P1, P1' of the partial portion 12, 12' increases in the first spatial direction with increasing angle extension, whereas the angles $\alpha 1$, $\alpha 1'$ stay equal. As shown in FIG. 5h, the width P2, P2' of the partial portion 12, 12' increases in the second spatial direction also with increasing angle extension whereas the angle $\alpha 2$, $\alpha 2'$ stays equal. As already explained with reference to FIG. 3f, it is, however, also conceivable that the angles $\alpha 1$, $\alpha 1'$ and/or $\alpha 2$, $\alpha 2'$ also slightly change depending on the position of the respective partial portion 12, 12', whereby the respective width P1, P1' and/or P2, P2' of the respective partial portion 12, 12' also changes, however, not to the extent as if the angles $\alpha 1$, $\alpha 1'$ and/or $\alpha 2$, $\alpha 2'$ are not subjected to a change.

As shown in FIGS. 5d and 5f, the object 40 is represented on the monitor 30 in a non-distorted manner and the object 50 is represented on the monitor 30 in a slightly distorted manner. By the hardly or only slightly distorted representation of the objects 40 and 50 on the monitor 30, the driver may well recognize the size of the objects 40 and 50 as well as their position and orientation in the vehicle environment. Thus, the driver may reliable assess whether the truck collides with the object 40 and/or the object 50 during the planned driving manoeuver or not. In this respect, a compensation of the distortion behavior of the camera 10 by the image processing unit 20A, 20B in two spatial directions promotes a further distortion-free representation of objects in comparison to a compensation in merely one spatial direction. Thus, compensations in more than two spatial directions are also conceivable, in order to allow a further distortion-free depiction of objects.

Figure 5I:
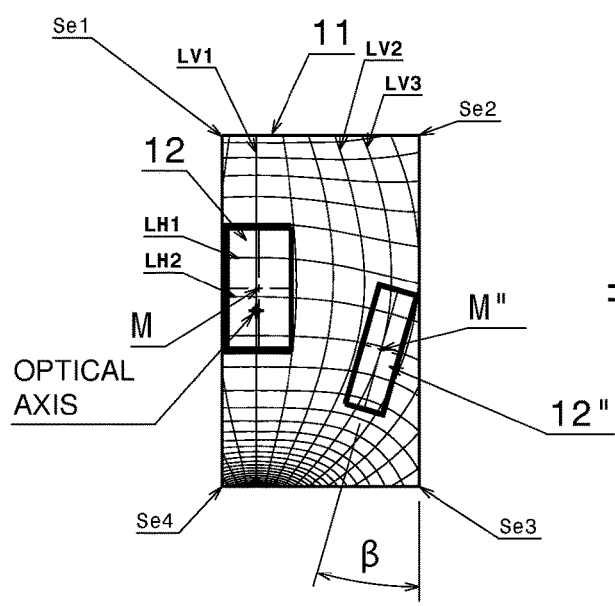
FIG. 5j shows a developed view of the grid cylinder of FIG. 2c related to the situation in FIG. 5i.
FIG. 5k shows a monitor of the view system according to the invention in accordance with a third embodiment.

In FIG. 5i, an image sensor 11 is shown, on which a partial portion 12 and a partial portion 12" are defined. A partial portion 12" corresponds to a partial portion, which is rotated with respect to the partial portion 12' of FIG. 5e. That is, the partial portion 12" corresponds to a partial portion which is already geometrically adapted to the taking position and, in addition, is rotated with respect to the vertical edge of the image sensor. As already described with respect to FIGS. 4a and 4b, a distortion behavior of an optical element may be further reliably compensated by adapting the geometry of a partial portion taken from the image sensor and by rotation of the adapted geometry.

As it is shown in FIG. 5i, the grid cylinder (see FIG. 2c) captured by the camera 10 is depicted on the sensor surface of the image sensor 11. By the distortion behavior of the optic and the fundamental rules of perspective, the vertical lines VL of FIG. 2c run in FIG. 5e not parallel to the vertical edge of the image sensor 11, but are depicted as bent (virtual) lines LV1, LV2, LV3, etc. (generally referred to as LV). Also, the horizontal lines HL of FIG. 2c run in FIG. 5i not parallel to the horizontal edge of the image sensor, but are depicted as bent (virtual) lines LH1, LH2, etc. (generally referred to as LH). The bending of the lines increases from the center of distortion towards the edge of the image sensor. The partial portion 12 lies in a portion of the image sensor in which the edges of the partial portion 12 are merely parallel to the vertical and horizontal lines of the depicted grid pattern. Thus, the partial portion 12 is almost distortion-free depicted on the sensor. The partial portion 12" lies in a portion of the image sensor, in which the vertical and horizontal lines of the depicted grid pattern are strongly bent.

If the geometry of the partial portion 12 was taken from a portion of the image sensor, whose vertical lines LV1, LV2, LV3 and horizontal lines LH1, LH2 are strongly bent, without adaptation of the geometry, the image data of the partial portion 12 on the monitor would be reproduced in a strongly distorted manner. For compensating the distortion, the geometry of the partial portion 12 (with center M) may, as shown in FIGS. 5a to 5h, be adapted to the taking position on the image sensor, if taken at a position on the image sensor, where the vertical lines LV1, LV2, LV3 and the horizontal lines LH1, LH2 are strongly bent. The distortion may be even better compensated if the geometry is, in addition, adapted to the progression and the bend, respectively, of the horizontal lines LH1, LH2 and the vertical lines LV1, LV2, LV3, i.e., if the geometry is rotated in view of the vertical orientation on the image sensor, such that the longitudinal axis and the lateral axis of the geometry which run through the center M" of the geometry lie tangentially at a respective bent horizontal line LH and vertical line LV. The rotation angle, with which the partial portion 12" is rotated in view of the vertical orientation of the sensor edge, is referred to as β.

The determination of the rotation angle β occurs by means of a vector field. In this respect, for each point of the sensor surface (e.g., each pixel), an associated angle is determined and stored in a database. That is, for each sensor pixel, based on the depiction function of the optical element with a distortion curve and the inclination angle of the camera (see FIG. 2c), a coordinate is associated to the cylinder grid pattern, which is depicted on the image sensor 11. In this respect, it is not required that each pixel has a direct association. The values between the stored points may, for example, be determined by interpolation. The determination of the angle may occur empirically or by means of calculation. It is sufficient to determine the position of a point of a partial portion by means of its position on the sensor. The point may, for example, be a center M" of the partial portion 12" which lies in the center of the partial portion 12". Dependent on the position of the center M" in the partial portion 12" on the image sensor, the control unit 20A, 20B reads out a rotation angle from the database and rotates the partial portion 12' around the read out angle.

Figure 5J:
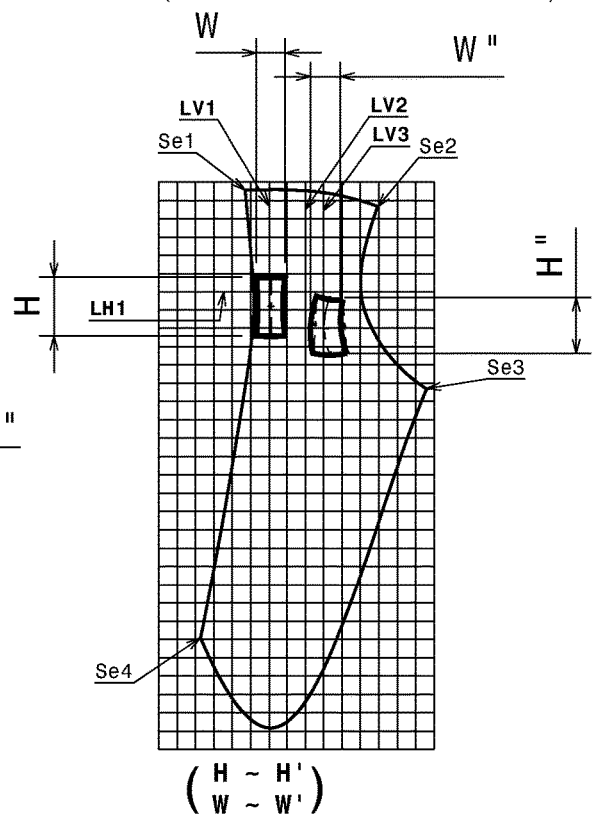

For ease of comprehension, in FIG. 5j, a projection of the grid cylinder of FIG. 2c related to the situation of FIG. 5i is shown. The points Se1, Se2, Se3 and Se4 mark corner points of a projected intersection of the field of view of the camera and correspond to corner points of the image sensor Se1, Se2, Se3 and Se4. As can be taken from FIG. 5j, the partial portion 12 has a height H and a width W, while the partial portion 12" has a height H" and a width W" which are approximately equal (H~H", W~W").

Figure 5K:
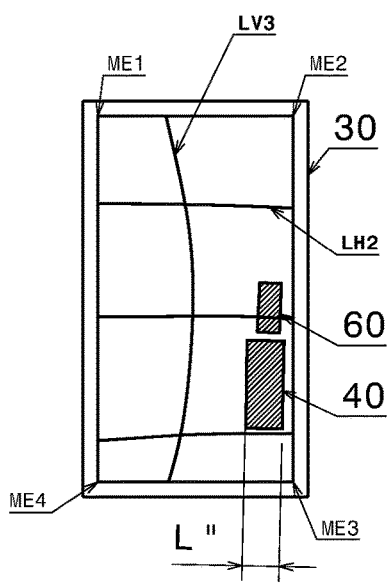

The transmission of the rotated partial portion 12" from the image sensor 11 to the monitor 30 may occur by means of a transformation matrix based on the changed geometry and the rotation. In this respect, the points Se1, Se2, Se3 and Se4 correspond to the points ME1 to ME4 on the monitor. The partial portion 12", thus, is depicted on the monitor 30 in its entirety. As shown in FIG. 5k, the objects 40 and 60 are depicted on the image sensor almost distortion-free due to the changed geometry and the rotation of the partial portion 12". The object 40 has, for example, a width L" on the monitor 30 which corresponds to the ratio of the width L of the object 40 in the vehicle environment.

Figure 6A:
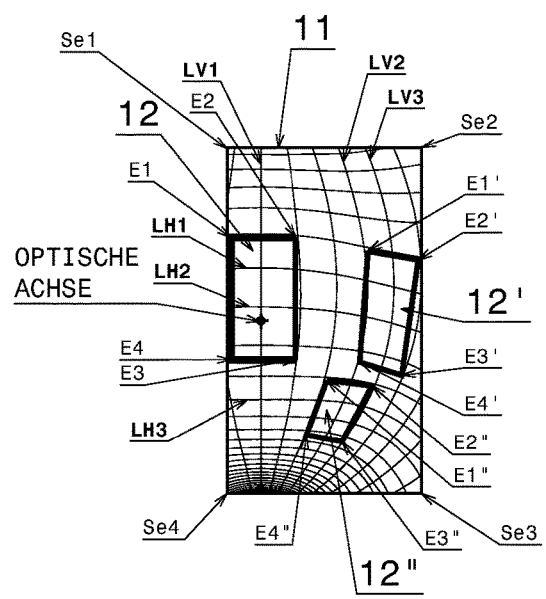
FIG. 6a shows an image sensor of the view system according to the invention with a fourth embodiment.
Figure 6B:
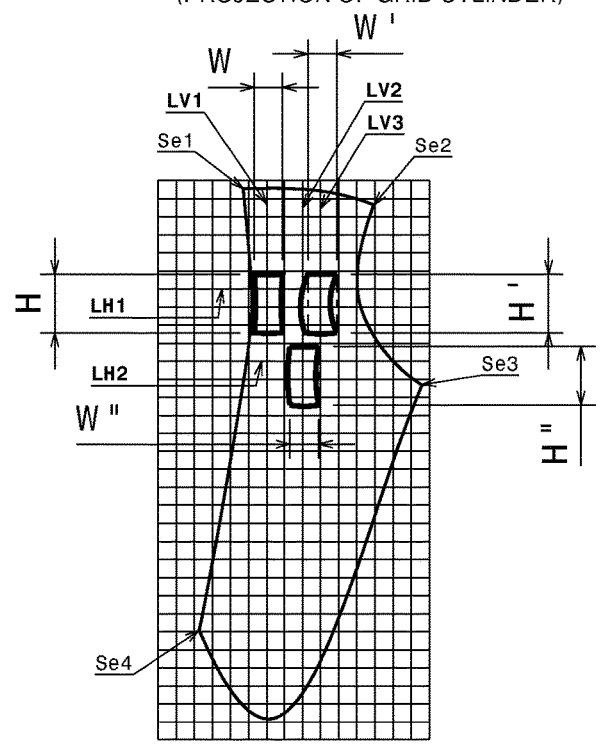
FIG. 6b shows a developed view of the grid cylinder of FIG. 2c related to the situation in FIG. 6a, and FIG. 6c shows a monitor of the view system according to the invention in accordance with the fourth embodiment.
Figure 6C:
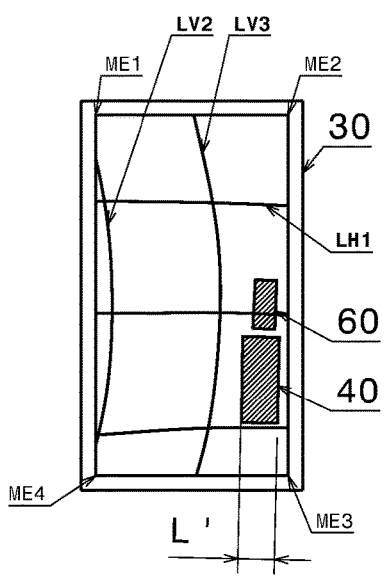

FIGS. 6a to 6c show a further approach how the geometry of the partial portion 12, 12', 12" is adapted dependent on the position on the image sensor 11 such that a distortion behavior of an optical element may be compensated as far as possible. As shown in FIG. 6a, three partial portions 12, 12' and 12" are defined on the image sensor. All three partial portions 12, 12' and 12" are subjected to a matrix transformation, i.e., a perspective transformation dependent on their respective position on the image sensor 11.

In contrast to the method of FIGS. 5i to 5k, which is the basis in FIGS. 6a to 6c, however, during the determination of the geometry of the partial portions 12, 12' and 12" at certain positions, not the rotation angle is determined, but characteristic points of the partial portions 12, 12' and 12" such as the corner points of the partial portion 12, at which the side edges of each of the partial portions 12, 12', 12" intersect each other, are used for determination of the geometry. With respect to FIG. 6a and FIG. 6c, the points E1 to E4 are used for the partial portion 12, the points E1' to E4' are used for the partial portion 12' and the points E1" to E4" are used for the partial portion 12", respectively, as input data for a matrix transformation, while the corner points of the monitor ME1 to ME4 form the target data for the matrix transformation.

FIG. 6b shows again a projection of the grid cylinder of FIG. 2c. Points Set, Se2, Se3 and Se4 mark again corner points of a projected intersection of the field of view of a camera and correspond to the corner points of the image sensor Set, Se2, Se3 and Se4. As can be taken from FIG. 6b, the partial portion 12 has a height H and a width W, while the partial portion 12' has a height H' and a width W', and the partial portion 12" has a height H" and a width W" which are each approximately equal (H~H' H", W~W'~W").

The transmission of the partial portions 12, 12', 12" from the image sensor 11 to the monitor 30 occurs by means of a transformation matrix. The corner points ME1 to ME4, in this respect, form target data/target points of the partial portion 12', which correspond to the corner points E1' to E4'. Thereby, as shown in FIG. 6c, the object 40 has, for example, a width L' on the monitor 30 which corresponds to the ratio of the width L of the object 40 in the vehicle environment. In general, the shape of the partial portions 12, 12', 12" on the image sensor 11 and correspondingly on the monitor 30 is dependent on the distortion behavior of the optical element.

A distortion behavior of an optical element, thus, may be compensated in a more reliable manner by adapting the geometry and an additional rotation of the geometry dependent on the position of the geometry on the image sensor than by simply adapting the geometry. The invention should be understood such that for compensation of a distortion behavior of an optical element, an exclusive rotation of the geometry may also occur.

Generally, the representation of the environment around a vehicle, i.e., the representation of the image data from the depiction angles and, thus, the partial portions, on a single monitor with only a single monitor portion may occur temporarily subsequently or on a single monitor with separated monitor portions simultaneously. The separated monitor portions may be arranged adjacent or on top of each other in a left and right direction of the monitor and may include further fields of view of a main mirror and/or a wide angle mirror of a commercial vehicle, such as defined in the ECE R 46, e.g., the field of view of a main mirror in an upper monitor portion and the field of view of a wide angle mirror in a lower monitor portion. It is also conceivable that all fields of view are represented in a monitor with a single monitor portion. This requires spatially adjacent or at least closely located partial portions and a continuous or sectional compensation of the distortion behavior of the optical element over the image sensor surface in which the partial portions are located, such that a continuous complete image of the vehicle environment (without interruption) is generated which allows the driver a quick assessment of the vehicle environment. Finally, the partial portions may be represented at different times, e.g., depending on the driving situation or inputs of the driver. Finally, a representation of different partial portions on a plurality of monitors is also conceivable.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A view system for a vehicle, comprising:
    at least one image capture unit for capturing image data of a portion around a vehicle, wherein the image capture unit has an image sensor and an optical element, wherein the optical element has a distortion curve, wherein image data dependent on the position on the image sensor are distorted in accordance with the distortion curve of the optical element;
    at least one image processing unit for processing the image data captured by the image capture unit; and
    at least one reproduction unit for reproducing the image data processed by the image processing unit,
    wherein the image processing unit is configured for taking at least one partial portion from the image data of the image sensor, wherein the geometry of the partial portion is dependent on the position of the partial portion on the image sensor, and
    wherein the geometry of the partial portion is determined by a calculation algorithm which uses at least one compensation curve (K), with which the width (P1') and/or the length (P2') of the partial portion on the image sensor is determined dependent on a change in position of the depiction angle ($\alpha$, $\alpha 1$, $\alpha 2$) of the image capture unit corresponding to the partial portion.

2. The view system according to claim 1, wherein the partial portion defines a reference partial portion with a reference geometry.

3. The view system according to claim 2, wherein the partial portion defines a reference partial portion, if the partial portion is taken from the image sensor in the vicinity of a position which corresponds to the depiction of a center of distortion of the image capture unit on the image sensor.

4. The view system according to claim 3, wherein the partial portion is taken from the image sensor at a position or directly adjacent to a position which corresponds to the depiction of the center of distortion of the image capture unit on the image sensor.

5. The view system according to claim 3, wherein the center of distortion is the optical axis.

6. The view system according to claim 2, wherein the reference geometry is a rectangle with a width (P1) and a length (P2).

7. The view system according to claim 2, wherein the partial portion has a geometry which is rotated and/or distorted and/or scaled with respect to the reference geometry, if the partial portion is arranged distally to the position which corresponds to the depiction of the center of distortion of the image capture unit on the image sensor.

8. The view system according to claim 7, wherein the degree of rotation and/or distortion and/or scaling of the reference geometry increases at least partially with increasing distance to the depiction of the center of distortion of the image capture unit on the image sensor.

9. The view system according to claim 7, wherein the degree of rotation and/or distortion and/or scaling of the reference geometry decreases area by area with increasing distance to the depiction of the center of distortion of the image capture unit on the image sensor.

10. The view system according to claim 2, wherein the depiction angle ($\alpha$, $\alpha 1$, $\alpha 2$), which corresponds to the reference partial portion, and the depiction angle ($\alpha'$, $\alpha 1'$, $\alpha 2'$), which corresponds to the partial portion, are equal.

11. The view system according to claim 1, wherein the determination of a first dimension of the geometry of the partial portion occurs in a first spatial direction.

12. The view system according to claim 11, wherein the determination of a second dimension of the geometry of the partial portion occur in a second spatial direction.

13. The view system according to claim 12, wherein the first and the second spatial direction run perpendicular to each other.

14. The view system according to claim 1, wherein the compensation curve (K) corresponds to a non-linear curve and/or at least one mathematical function.

15. The view system according to claim 1, wherein the compensation curve (K) corresponds to a freely defined curve.

16. The view system according to claim 15, wherein the values of the freely defined curve are empirically determined and are stored in the processing unit.

17. The view system according to claim 1, wherein the compensation curve (K) corresponds to the distortion curve of the optical element.

18. The view system according to claim 17, wherein the compensation curve (K) additionally corresponds to a compensation curve of the optical element with a digital distortion correction.

19. The view system according to claim 1, wherein the partial portion includes the field of view of a main mirror and/or a wide angle mirror of a commercial vehicle.

20. A mirror replacement system for a vehicle with a view system, according to claim 1.

* * * * *